United States Patent [19]

Mercuzot

[11] Patent Number: 5,961,357
[45] Date of Patent: Oct. 5, 1999

[54] CONNECTION SYSTEM FOR TUBE CONDUCTORS

[75] Inventor: Dominique Mercuzot, Dijon, France

[73] Assignee: The Whitaker Corporation, Wilmington, Del.

[21] Appl. No.: 09/142,388
[22] PCT Filed: Apr. 3, 1997
[86] PCT No.: PCT/IB97/00342
§ 371 Date: Sep. 2, 1998
§ 102(e) Date: Sep. 2, 1998
[87] PCT Pub. No.: WO97/38466
PCT Pub. Date: Oct. 16, 1997

[30] Foreign Application Priority Data

Apr. 9, 1996 [EP] European Pat. Off. .............. 96400766

[51] Int. Cl.⁶ .......................................... H01R 4/50
[52] U.S. Cl. .......................................... 439/863; 439/814
[58] Field of Search .................... 439/814, 810; 200/61.45 R, 863, 805

[56] References Cited

U.S. PATENT DOCUMENTS

| | | | |
|---|---|---|---|
| 2,911,616 | 11/1959 | Townsend . | |
| 3,044,040 | 7/1962 | Olsson . | |
| 3,952,395 | 4/1976 | Crossman et al. | 29/401 |
| 4,033,662 | 7/1977 | Swiger | 339/113 R |
| 4,303,295 | 12/1981 | Schreder | 339/92 R |
| 4,467,154 | 8/1984 | Hill | 200/61.45 |
| 4,469,356 | 9/1984 | Duret et al. | 285/332 |
| 5,194,013 | 3/1993 | Prop | 439/265 |
| 5,201,914 | 4/1993 | Hollick | 439/801 |
| 5,431,379 | 7/1995 | Takagi | 267/273 |
| 5,503,568 | 4/1996 | Pryce | 439/427 |
| 5,816,852 | 10/1998 | Conrad | 439/512 |

FOREIGN PATENT DOCUMENTS 42 12 771-A1  10/1993  Germany .......... F16L 19/08

Primary Examiner—Steven L. Stephan
Assistant Examiner—Chandrika Prasad
Attorney, Agent, or Firm—Driscoll A. Nina, Jr.; Bradley N. Ditty

[57] ABSTRACT

A tube conductor, for example made in copper, is interconnected to a connector housing, for example made of aluminum alloy, by stuffing an insert, for example a steel ball, into the tube. The steel ball expands the tube and clamps it in the cavity of the housing. This construction enables elastic energy to be stored that increases the reliability and lifetime operation of the connector. It also enables a copper conductor to be reliably connected to aluminum connector, even though their thermal expansion coefficients differ, by suitable choice of material and dimensioning of the insert.

9 Claims, 3 Drawing Sheets

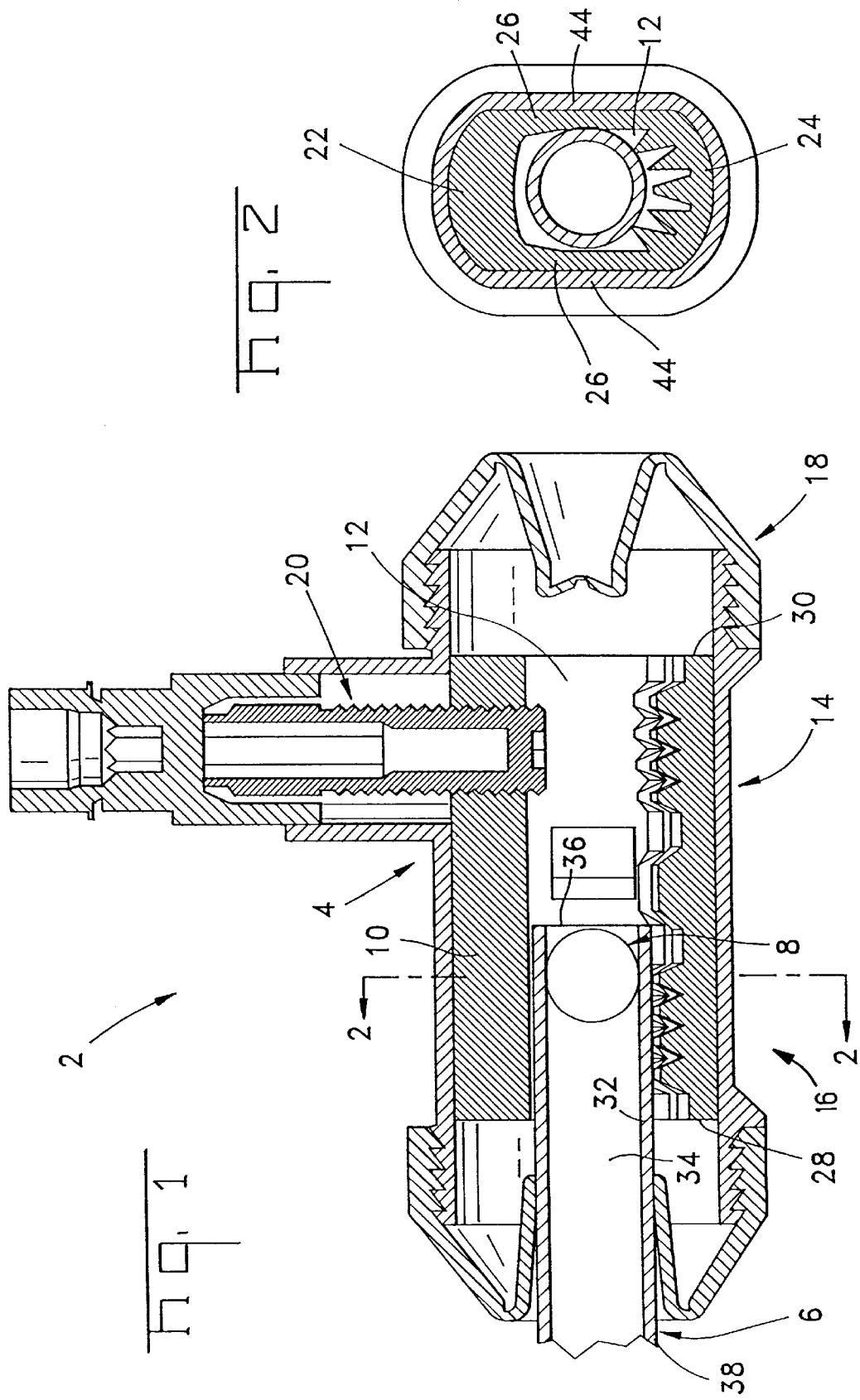

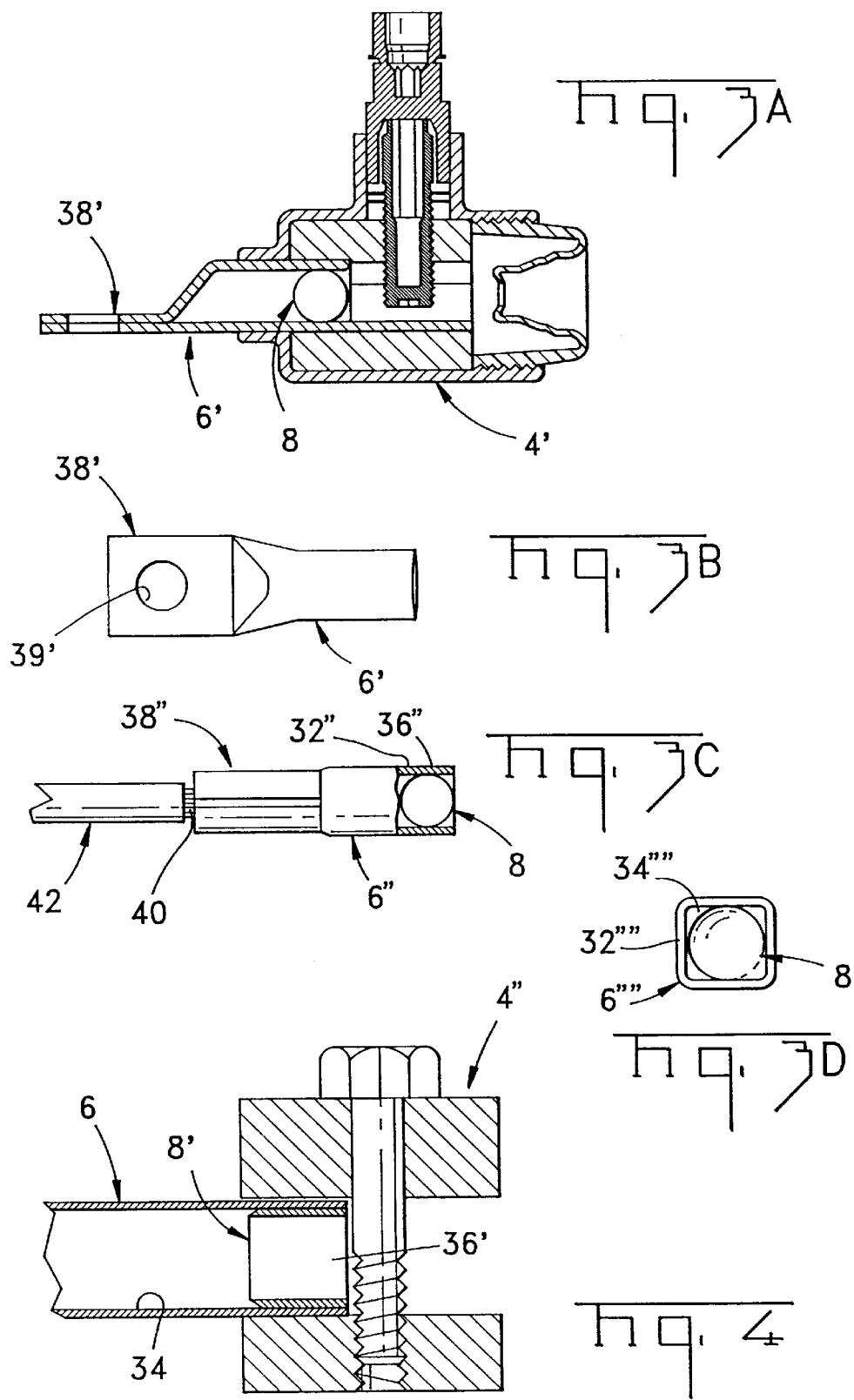

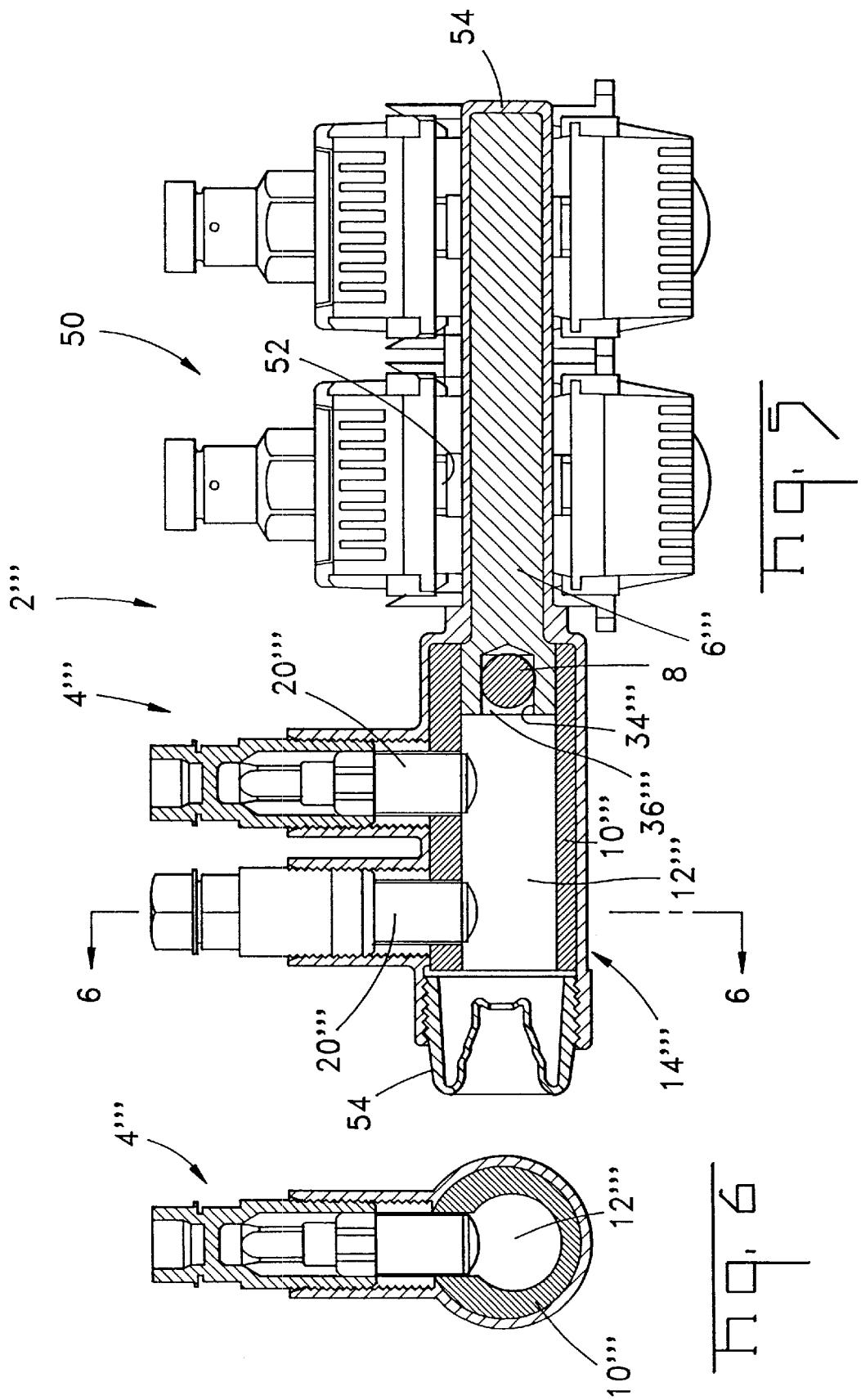

CONNECTION SYSTEM FOR TUBE CONDUCTORS

BACKGROUND OF THE INVENTION

1. Field of the Invention

This invention relates to a system or means for connecting tubular shaped conductors to other conductors, particularly for use in electrical power supply lines.

2. Summary of the Prior Art

In the power supply and transmission industry, there are many applications where conductors, or sections of conductor are provided with a hollow cylindrical tube, for example a rigid tube in copper or aluminum, for connection to a clamping connector. For certain applications, tube conductors may have a number of mechanical and electrical advantages. For example, in proportion to their mass, they have good electrical current transmission properties due to "skin effect", whereby electrical current intensity tends to be greater proximate the surface of a conductor than within the core. There may be other advantages, for example tube conductors have larger contact surfaces than solid conductors (i.e. there diameter is greater for a given conductor cross-sectional area). Tube conductors can also be used at their ends to receive other conductors therein, the tube conductor being crimped to the inner conductor for interconnection purposes. The tube conductor may also provide a lightweight rigid interconnection means between electrical connectors or devices located in proximity with each other.

One of the problems with tube conductors is the difficulty of connecting the conductor to a connector, and maintaining a reliable connection over the lifetime of the connector. For example, in the electrical power industry it is typical to use clamping connectors that comprise bolts for clamping down on a conductor inserted in the connector. When using a tube conductor, it is typical to crush the tube during the clamping with a bolt, in order to provide the required contact force to ensure good electrical connection. Deformation of the tube may be disadvantageous if it is important to maintain the cylindrical shape of the tube conductor in a region proximate the connector. Furthermore, the large deformation displacement entails greater unreliability in the quality of the crushed conductor, contrary to a solid conductor which can be supported around the whole periphery such that maximum contact surface area and pressure is obtained. Upon thermal and mechanical stresses, a crushed tube conductor may relax and as a consequence contact forces are reduced and the performance of the connection is impaired. Another problem in the power industry is to interconnect different metals, for example aluminum alloys to other conductors such as copper, brass or steel. One of the problems stems from the different thermal expansion coefficients of different metals. Differing expansions of metals held fairly rigidly together in the contact region may cause plastic deformation thereof, leading to a relaxation of contact pressure between the contacts. It is also particularly problematic to connect aluminum to another conductor by a clamping conductor, because of the stress relaxation properties of aluminum when subject to thermal or mechanical stress cycles. The latter effects pose a problem in the industry as it is often necessary to make the transition from a copper conductor, for example, to an aluminum conductor.

SUMMARY OF THE INVENTION

It is an object of this invention to overcome the above mentioned problems.

It is an object of this invention to provide a reliable connection to tube conductors.

It would be advantageous to provide a reliable connection system for interconnecting conductors of different materials, in particular aluminum alloy to another conducting material.

It would be advantageous to provide a connections system for conductors used in the power generation and transmission industry, that have advantageous contact properties throughout the expected lifetime of the connection when subject to operational, thermal and mechanical stresses.

Objects of this invention have been achieved by providing a tube conductor connection system according to claim 1. In particular, a tube conductor connection system is shown comprising a tube conductor having a cavity extending therein, and an insert having a profile substantially conforming to the profile of the tube conductor cavity, the separate insert being mounted within the cavity of the conductor. The tube conductor and insert assembly can thus be clamped by a connector, the clamping force occurring in the proximity of the positioning of the insert within the tube. Crushing of the tube is thus prevented. Furthermore, the insert can be selected in a material with an elasticity greater than the tube conductor (for example the insert is steel and the conductor copper or aluminum) such that the insert provides elasticity to the contact between the clamping connector and the tube conductor. The increased elasticity maintains a greater contact force over the lifetime of the conductor as the connector is more tolerant to stress relaxation of the tube conductor. The insert can be provided as a sphere, which is easy to insert into the tube conductor, and is furthermore a cost effective part and does not need to be oriented in any particular manner for insertion into the tube conductor. Furthermore, the rounded shape of the sphere enables easy insertion into the tube conductor under compression and provides a defined, high pressure contact line with the tube.

The clamping connector may comprise a body having a cavity extending therein for receiving the tube conductor, whereby the tube conductor is clamped to the connector by insertion of the insert in the tube conductor, thereby expanding the tube conductor and clamping it against the inner wall of the connector cavity. In the latter example, the tube conductor would be elastically clamped between the insert and the connector clamping wall, elasticity being provided by both the insert and the connector wall such that a relatively large degree of relaxation in the tube conductor would be possible without impairment of the contact.

Another connection means would be to insert the insert into the tube conductor in an interference fit, such that the insert is securely held therein, and then clamping the tube conductor as if it were a solid conductor by any conventional means (such as screw clamps, crimping etc.).

In order to further improve the connection with respect to thermal dilatation, the material of the insert could be selected to have a thermal expansion coefficient which is less than or equal to the thermal expansion coefficient of the tube conductor. Upon heating up due to electrical currents, the thermal expansion of the insert would not crush the tube conductor against the connector to an extent greater than at room temperature, thereby preventing relaxation due to thermal expansion and contraction. The increased elasticity of the above solution also is particularly advantageous when interconnecting aluminum alloy conductors to other material such as copper alloys. For example, a tube conductor of copper alloy, can be clamped to an aluminum connector elastically by means of a steel ball insert. As the insert and aluminum conductor can be designed to function in the elastic range, in particular because a large contact area is provided between the tube conductor and aluminum and the insert provides additional elasticity, greater flexibility of the connection region is achieved, therefore reducing the effects of stress relaxation.

Other advantageous aspects of this invention are described in the claims or will be apparent from the description and drawings.

BRIEF DESCRIPTION OF THE DRAWINGS

FIG. 1 is a cross-sectional view through a connection system according to this invention;

FIG. 2 is a cross-sectional view through lines 2—2 of FIG. 1;

FIG. 3a is a cross-sectional view of another embodiment;

FIG. 3b is a top view of a particular embodiment of a tube conductor used in the system of FIG. 3a;

FIG. 3c is a partial cross-sectional view through another embodiment of a tube conductor crimped to a conducting cable, such conductor also being usable in the systems of FIGS. 1 and 3a;

FIG. 3d is an end view of another embodiment of a tube conductor with a rectangular profile usable in the systems of FIGS. 1 and 3a;

FIG. 4 is a schematic cross-sectional view through another embodiment according to this invention;

FIG. 5 is a cross-sectional view through yet another embodiment according to this invention;

FIG. 6 is a cross-sectional view through line 6—6 of FIG. 5.

DETAILED DESCRIPTION OF THE PREFERRED EMBODIMENT

Referring to FIGS. 1 and 2, a connector system 2 comprises a connector 4, a tube conductor member 6, and an insert 8. The connector 4 comprises a conductive housing 10 having a cavity 12 extending therethrough, a first conductor connection section 14, a second conductor connection section 16, and an outer sealing member 18. The first conductor connection section 14 comprises a clamping bolt 20 extending into the cavity 12 for clamping a conductor, for example a conductor bar or stranded conductor cable positioned within the cavity 12. The housing 10 is formed by a top wall 22, a bottom wall 24, and side walls 26 extending therebetween, the walls surrounding and forming the cavity 12. In this embodiment, the housing extends from a first connection end 28 to a second connection end 30 and is substantially prismatic in shape. The housing 10 can for example be manufactured by extrusion of aluminum alloy or other conductive material.

The tube conductor member 6 comprises a cylindrical outer wall 32 forming a cylindrical cavity 34 therein, the tube extending from an open insert receiving end 36 to a connection section 38. It would also be possible to consider tubes of polygonal or irregular profiles, although cylindrical tubes are commonly used. The connection section could extend to any type of connector, for example as shown in FIGS. 3a and 3b, the connection section 38' comprises a planar section formed by crushing the tube 32, and is provided with a bolt hole 39' for anchoring the connection section 38' to a complementary conductor or conductive structure. A further example is shown in FIG. 3c, where the connection section 38" is crimped to the conducting core 40 of an insulated conducting cable 42. The crimping for example is effected by deformation of the cylindrical tube into a hexagonal shape that crushes the cable conductor 40 within the tube cavity 34.

Referring back to FIGS. 1 and 2, the insert 8 is a spherical steel ball having dimensions (i.e. diameter) slightly greater than the dimensions of the tube cavity 34 such that the insert fits therein in an interference fit. In this embodiment, assembly of the tube conductor 6 to the connector 4 is effected as follows. The tube 6 is first inserted into the cavity 12 of the connection section 16. The insert 8 is then inserted through the cavity 12 from the other connection section end 30 and subsequently driven with force into the tube cavity 34 at the insert end 36. Due to the spherical shape, the insert does not need to be precisely positioned or aligned with the cavity 34 and merely needs to be stuffed by means of a ram that presses on the insert to stuff it into the cavity 34. Due to the interference fit, the insert 8 expands the diameter of the tube wall 32 in the region proximate the insert. The tube diameter is chosen such that it is similar to the width of the cavity 12 between the side walls 26, with a little play to enable insertion of the tube into the cavity. The expansion of the tube upon insertion of the insert causes the tube to abut the side walls 26. The diameter of the insert 8 can be selected such that resilient deformation of the side walls 26 occurs such that elastic energy is stored both in the connector housing (and in particular the side walls 26) and by elastic compression of the steel ball insert 8. As is illustrated in FIG. 2, the side walls 26 store elastic energy by bulging outward in their central portions 44.

This means of assembling a tube conductor to the housing 10, which enables the contact pressure to be generated by elastic deformation, is particularly advantageous with regard to changing thermal and mechanical stresses acting on the connection. Such effects are further aggravated when different materials are interconnected, such as providing the tube in copper and the connector body in aluminum alloy, which have different thermal expansion coefficients. Large variations in temperature due to atmospheric temperatures, and heat generated by electrical current cause cyclical contraction and expansion of the tube 6 and connector housing 10. If a relatively rigid connection was provided between copper and aluminum, high thermal stresses due to the differences in thermal expansion, would cause plastic deformation of the contact section of one or other of the metals and upon change in temperature the contact pressure may be significantly reduced, thereby effecting the electrical performance of the connection. By providing an insert, that effects a contact pressure with a greater elastic range, greater thermal stresses can be absorbed before plastic deformation occurs, thereby maintaining sufficient contact pressure over a wider range of operational temperatures.

Furthermore, the thermal coefficient of the insert can be selected (by selecting the material) so as to match the coefficient of expansion of the connector housing 10, or possibly have a lower expansion coefficient to prevent plastic deformation of the connector housing 10 or tube conductor wall 32.

As shown in FIG. 3c, the tube conductor member 6" can be pre-mounted with an insert 8 which can then be clamped to a connector, for example by insertion into the clamping connection section 14 of the connector 4 in FIG. 1, whereby the bolt 20 is screwed down on the tube conductor over the insert portion 36". The insert 8 prevents collapse of the tube wall 32", and furthermore stores elastic energy that improves the contact pressure over a range of stresses for the reasons already described above.

The provision of the ball insert 8 out of steel is found to be particularly advantageous due to the elastic and thermal coefficient properties of steel, as well as its strength. Other alloys could also be considered, such as brass, whereby the connector housing 10 could also be provided of such a material. The materials of the insert, connector housing, and tube conductor will of course depend on the circumstances such as the operating temperature range, level of electrical current to be transported, mechanical requirements on the connection system etc., whereby the dimensioning of the insert 8 and the choice of its material can be effected by experimentation in order to store elastic energy and prevent excessive stresses on the connection within the range of operational temperatures to which the connection is subject.

Referring to FIG. 3d, a tube conductor 6" is provided in a polygonal shape, in this embodiment having a rectangular outer wall 32"", and fitted with a spherical ball insert 8. The ball insert supports the top and side walls of the tube from crushing, even though it does not conform exactly to the cavity of the tube. It shall be understood that in such an embodiment the insert 8" "conforms substantially" to the tube conductor cavity 34"" shape, as the support function is similar to the above-described embodiments with respect to the contact regions of the tube.

Referring to FIG. 4, another embodiment of the connection system is shown with an insert 8' that is tubular, and having outer dimensions (i.e. diameter) greater than the cavity 34 of the tube conductor 6 for interference therein. The insert 8' is selected to have greater elasticity and strength and the tube conductor 6. For example, the insert 8' could be of stainless steel whilst the tube conductor is copper. As sufficiently high clamping force by a connector 4' can thus be applied on the insert section 36' within the elastic range of the insert 8'. The embodiment of FIG. 4 could of course be used in the same applications as those described above, where the insert is a ball.

In situations where the connector 4 or 4" is clamped onto the tube, the provision of an interference fit between the insert and tube could be omitted.

Referring to FIGS. 5 and 6, yet another embodiment is shown whereby the tube conductor 6''' is a solid bar with a bore 34''' at an insert end 36''' to enable insertion of an insert 8 in an interference fit therein. The principle of connection between the insert section 36''' of the conductor 6''' is the same as that already described for the previous embodiments. This embodiment enables the end of a power cable to be clamped by the bolts 20''' in one end 14''' of the connector housing cavity 12''', whereby the connector assembly 2''' can be further interconnected to clamping tap connectors 50 with clamping jaws 52 that clamp onto the solid bar conductor 6''' for connection thereto. The tap connectors 50 are common in the power transmission industry.

The advantage of the above assembly is that it is easier to seal the end of the cable by positioning within the cavity 12''' of the connector 4''' due to provision of the external sealing 54 around the connector 4'''. If the cable end were clamped directly to the tap connectors 50, the strands of the cable exposed at its end (the cable is otherwise surrounding by an insulating jacket) would allow the ingress of moisture and salts leading to corrosion of the conductor. Furthermore, the cable end is less rigid and robust than the conductor 6''' and can therefore not be connected and disconnected to tap connectors 50 as often as the conducting bar 6''' enables.

In the embodiment of FIG. 5, the connector housing 10''' comprises a cylindrical cavity 12''' that matches the outer profile of the insert end 36''' of the conductor 6'''. The elastic forces are therefore stored in the insert and in the whole periphery of the housing 10''' around the insert section.

Advantageously therefore, provision of an insert in a tube conductor enables elastic connection thereof to a connector thereby improving reliability of the connection over a range of temperatures, and furthermore allowing conductors of different materials such as copper and aluminum to be reliably interconnected.

I claim:

1. An electrical connector system comprising an electrical connector and a tube conductor receivable in a cavity of a housing of the connector, the tube conductor having a cavity extending therein, and a separate insert having a profile substantially conforming to the profile of the tube conductor cavity, the separate insert being mounted within the cavity of the conductor to support the tube elastically in a clamping relationship within the connector housing.

2. The connector system of claim 1 wherein the insert is a section of hollow tube.

3. The connector system of claim 1 wherein the insert is a spherical ball.

4. The connector system of claim 1 wherein the tube conductor is cylindrical.

5. The tube conductor connection system of claim 1 wherein the tube conductor has a polygonal outer wall forming the cavity.

6. The connector system of claim 1 wherein the insert has an outer profile of greater dimensions than the tube cavity such that an interference fit is provided therebetween.

7. The connector system of claim 1 wherein the insert material has a coefficient of thermal expansion less than the material of the tube housing.

8. The connector system of claim 1 wherein the insert elastically sandwiches the tube conductor against the connector housing, the elastic sandwiching made by stuffing of the insert into the tube conductor after the tube conductor is inserted in the housing cavity, the tube conductor being electrically and mechanically connected to the connector housing substantially only by such elastic clamping force.

9. The connector system of claim 1 wherein the tube conductor is premounted with the insert and clamped to the connector by fastening means enabling clamping of the premounted tube to the connector by actuation of the fastening means.

* * * * *